United States Patent
Wang

(10) Patent No.: US 9,544,003 B1
(45) Date of Patent: Jan. 10, 2017

(54) WEARABLE ELECTRONIC DEVICE

(71) Applicants: Beijing Lenovo Software Ltd., Beijing (CN); Lenovo (Beijing) Limited, Beijing (CN)

(72) Inventor: Peng Wang, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 0 days.

(21) Appl. No.: 14/980,922

(22) Filed: Dec. 28, 2015

(30) Foreign Application Priority Data

Sep. 29, 2015 (CN) .......................... 2015 1 0634823

(51) Int. Cl.
*H05K 7/00* (2006.01)
*H04B 1/3827* (2015.01)

(52) U.S. Cl.
CPC ....... *H04B 1/385* (2013.01); *H04B 2001/3861* (2013.01)

(58) Field of Classification Search
CPC .............. H05K 7/00; G06F 1/16; H04M 1/04; H04B 1/385
USPC ... 455/41.2, 41.3, 90.3, 556.1, 575.1, 575.6; 343/718, 741, 870
See application file for complete search history.

(56) References Cited

U.S. PATENT DOCUMENTS

| | | | | |
|---|---|---|---|---|
| 5,189,431 A * | 2/1993 | Marinelli | ............... | H01Q 1/273 343/718 |
| 6,088,240 A * | 7/2000 | Steinhoff | ............ | H04M 1/0216 361/814 |
| 6,212,414 B1 * | 4/2001 | Alameh | ................. | H04B 1/385 455/347 |
| 6,329,903 B1 * | 12/2001 | Yamamori | ............. | H01Q 1/273 340/7.63 |
| 6,412,976 B1 * | 7/2002 | Dechery | .................. | A44C 5/00 368/281 |
| 6,634,786 B2 * | 10/2003 | Dinger | ............... | G04B 37/1486 368/10 |
| 6,854,978 B2 * | 2/2005 | Noirjean | ................ | H01Q 1/273 343/718 |
| 8,170,633 B2 * | 5/2012 | Shin | ....................... | H04B 1/385 455/558 |
| 8,787,006 B2 * | 7/2014 | Golko | ..................... | G06F 1/163 361/679.03 |
| 2007/0032271 A1 * | 2/2007 | Chan | ..................... | H04M 1/035 455/569.1 |
| 2015/0277384 A1 * | 10/2015 | Mankowski | ........... | G04G 21/04 368/10 |
| 2015/0378321 A1 * | 12/2015 | Fraser | .................... | G04G 17/04 368/10 |

* cited by examiner

*Primary Examiner* — Blane Jackson
(74) *Attorney, Agent, or Firm* — Schwegman Lundberg & Woessner, P.A.

(57) ABSTRACT

The present disclosure provides a wearable electronic device. The wearable electronic device comprises: a main body; a fixing member movably connected to the main body and configured to fix the main body on a supporting member; a connecting member configured to connect the main body and the fixing member; at least one antenna arranged in the fixing member, connected to a radio frequency unit in the main body via the connecting member, and configured to transmit signals.

7 Claims, 6 Drawing Sheets

WEARABLE ELECTRONIC DEVICE

CROSS-REFERENCE TO RELATED APPLICATION(S)

This application claims priority to Chinese Application No. 201510634823.4, filed on Sep. 29, 2015, which is incorporated herein by reference in its entirety.

TECHNICAL FIELD

The present disclosure relates to a field of computer technology, and in particular, to a wearable electronic device.

BACKGROUND

With the evolution of science and technology, electronic technology has been rapidly developed. Wearable smart devices, such as smart watches, smart glasses and so on, have come into reality.

Currently, there are some wearable smart devices provided with antennas for communicating with other devices. Typically, the antennas are arranged in a main body of a wearable smart device. For example, a kind of wearable smart devices are smart watches, wherein the antennas are typically integrated inside the watch dials.

However, because it may be required to integrate some other components, such as a processor and etc., in the main body of the wearable smart device, those components may cause electromagnetic interference with the antennas, thus adversely affecting transmitting/receiving performance of the antennas.

It can be seen that the antennas in the conventional wearable smart devices have poor performance.

SUMMARY

Embodiments of the present disclosure provide a wearable electronic device, which solves the technical problem with the conventional solutions, i.e. the poor performance of the antennas of the existing wearable smart device.

A first aspect of the present disclosure provides a wearable electronic device, comprising:

a main body;

a fixing member movably connected to the main body and configured to fix the main body on a supporting member;

a connecting member configured to connect the main body and the fixing member;

at least one antenna arranged in the fixing member, connected to a radio frequency unit in the main body via the connecting member, and configured to transmit signals.

Alternatively, the connecting member comprises a first connecting part, and a first antenna of the at least one antenna is connected to the radio frequency unit via the first connecting part.

Alternatively, the connecting member further comprises a shaft adapted to the first connecting part for connecting the fixing member and the main body.

Alternatively, the shaft has an accommodation space, and the first antenna is connected to the radio frequency unit via the accommodation space of the shaft.

Alternatively, the first antenna is connected to the radio frequency unit via a conductive part on one end of the shaft, the first antenna being any one of the at least one antenna.

Alternatively, one end of the first antenna is connected to the radio frequency unit in the main body via the first connecting part, and the other end of the first antenna is configured to:

be connected to a ground point of the wearable electronic device; or be set in a pendent state; or be connected to the radio frequency unit via a second connecting part of the connecting member, forming a closed loop.

Alternatively, the connecting member further comprises an engaging member, and the fixing member is connected to the main body via the engaging member.

Alternatively, the fixing member is made of plastic, silicone, or rubber, the at least one antenna being fixed in the fixing member by injection molding.

Alternatively, the fixing member is made of leather, and the fixing member has a hollow portion, the antenna being secured in the hollow portion of the fixing member by an adhesive.

Alternatively, the antenna comprises at least one of a main antenna, a diversity antenna, a Global Positioning System-enabled antenna, a Wireless Local Area Network-enabled antenna, and a Bluetooth-enabled antenna.

DETAILED DESCRIPTION OF THE EMBODIMENTS

In order to make the purposes, technical solutions and advantages of the embodiments of this disclosure more clear, the embodiments of the present disclosure will be described clearly and completely with reference to the attached drawings. It is apparent that the described embodiments are just some of the embodiments of the present disclosure, rather than all of the embodiments. Other embodiments contemplated by those skilled in the art, based on the embodiments in the present disclosure, without creative work are all within the protection scope of the present disclosure.

The wearable electronic devices in embodiments of the present disclosure may be any electronic devices which are wearable. Examples of the wearable electronic device may be a smart watch, smart glasses, a smart bracelet, etc. In the following description, a smart watch is illustrated as an example of the wearable electronic device. It should be noted that other wearable electronic devices are also within the protection scope of the present disclosure.

Hereinafter, preferred embodiments of the present disclosure will be described in detail in connection with the attached drawings.

Figure 1:
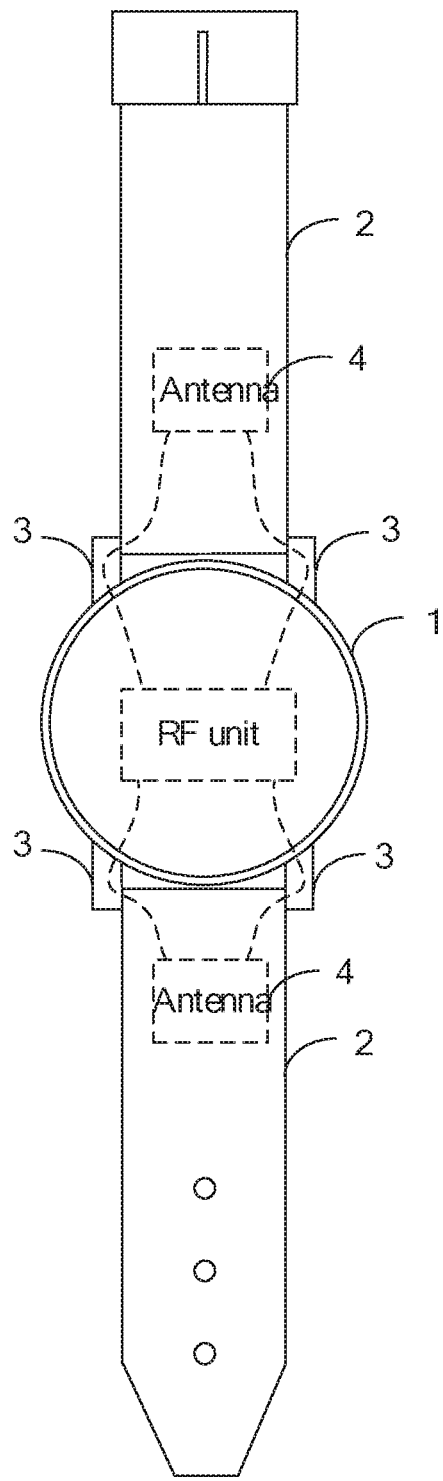
FIG. 1 illustrates a first structure diagram of a wearable electronic device according to an embodiment of the present disclosure.

With reference to FIG. 1, the present embodiment of the present disclosure provides a wearable electronic device, which comprises a main body 1, a fixing member 2, a connecting member 3 and at least one antenna 4. FIG. 1 shows a smart watch as an example of the wearable electronic device.

The fixing member 2 is movably connected to the main body 1, and is configured to fix the main body 1 on a supporting member.

The connecting member 3 is configured to connect the main body 1 and the fixing member 2.

The at least one antenna 4 is arranged in the fixing member 2, and connected to a RF unit in the main body 1 via the connecting member 3. The antenna is configured to transmit signals.

As shown in FIG. 1, the wearable electronic device, i.e. the smart watch, comprises two fixing members 2. The two fixing members 2 are two watchstraps of the wearable electronic device respectively. The main body 1 of the wearable electronic device is e.g. a dial of the wearable electronic device, wherein the respective fixing members 2 are movably connected to the main body 1 via the respective connecting members 3. The fixing members 2 can fix the main body 1 on the support member. For example, the watchstraps can be used for fixing the dial on the user's wrist.

In FIG. 1, the wearable electronic device comprises e.g. four connecting members 3. One fixing member 2 (e.g., one of the watchstraps of the smart watch) may be movably connected to the main body 1 (e.g. the dial of the smart watch) via two upper connecting members 3. The other fixing member 2 (e.g., the other one of the watchstraps of the smart watch) may be movably connected to the main body 1 via two lower connecting members 3.

In the embodiment of the present disclosure, the antenna 4 may be arranged in the fixing member 2. That is, the antenna of the smart watch may be arranged in the watchstrap of the smart watch. The antenna 4 can be connected to the RF unit in the main body 1 via the connecting members 3.

FIG. 1 shows an exemplary implementation wherein an antenna 4 is arranged in each of the fixing members 2. Other implementations are possible, which can be designed as desired in practical applications. For example, a wearable electronic device may comprise at least one fixing member 2 and at least one antenna 4. Then, it is possible to arrange a part of antenna 4 in each of the fixing members 2. Alternatively, it is possible to arrange a part of antenna 4 in a part of each fixing member 2. For example, it is possible to arrange all of the antennas 4 in one fixing member 2 etc. There is no limitation in the present disclosure regarding which of the fixing members the antennas 4 are arranged in.

Alternatively, in another embodiment of the present disclosure, the antenna 4 may be of various types. For example, the antenna may comprise at least one of a main antenna, a diversity antenna, a GPS (Global Positioning System)-enabled antenna, a WLAN (Wireless Local Area Networks)-enabled antenna, and a Bluetooth-enabled antenna. Of course, other types of antennas are possible, which are not limited in the present disclosure.

In the embodiments of the present disclosure, the antenna 4 of the wearable electronic device may be arranged in the fixing member of the wearable electronic device. The antenna 4 may be connect to the RF unit in the main body 1 via the connecting members 3 arranged on the main body 1, enabling functions of communicating signals with other devices. In this way, the antenna 4 is not necessary to be arranged within the main body 1, but can be arranged at a certain distance apart from the main body 1, so that electromagnetic interference on the antenna 4 caused by other components, such as a processor, incorporated in the main body may be effectively reduced and the performance of the antenna in the wearable electronic device may be improved while the signal transmitting/receiving capability of the wearable electronic device is enhanced.

Alternatively, in another embodiment of the present disclosure, the connecting members 3 comprise first connecting parts 301. A first antenna of the at least one antenna 4 is connected to the RF unit via the first connecting parts 301.

In the embodiment of the present disclosure, the first antenna 4 may be any one of the at least one antenna 4. For example, the at least one antenna 4 of the wearable smart watch comprises a main antenna, a diversity antenna, a GPS-enabled antenna. Then, the first antenna 4 may be e.g. a main antenna, or the first antenna 4 may be a diversity antenna, or the first antenna 4 may be an antenna integrating multiple kinds of antennas, such as an antenna integrating a main antenna, a diversity antenna and a GPS-enabled antenna. The present disclosure has no limitation in this regard.

Figure 2:
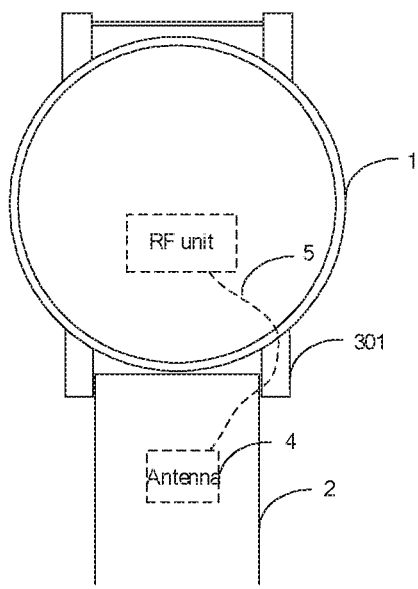
FIG. 2 illustrates a second structure diagram of a wearable electronic device according to an embodiment of the present disclosure.

With reference to FIG. 2, the antenna 4 in FIG. 2 is the first antenna 4 in this embodiment. For example, it may be the main antenna of the smart watch. The connecting member in the right part of FIG. 2 is the first connecting part 301 in this embodiment. The first connecting part 301 may have a hollow structure, whose hollow portion may connect an interior of the main body 1 and an interior of the fixing member 2. Thus, the first antenna 4 in the fixing member 2 may be connected to the RF unit in the main body 1 via the hollow portion of the first connecting part 301.

There is no limitation on connecting manners in this embodiment. For example, conduction means 5 (e.g. a wire, or other types of conduction means) may be used for connecting the first antenna 4 to the RF unit in the main body 1. One end of the conduction means 5 may be connected to the first antenna 4 in the fixing member 2; and the other end can pass through the hollow portion of the first connecting part 301 and be connected to the RF unit of the main body 1. Other connecting manners are possible.

Using the connecting manner as illustrated in this embodiment of the present disclosure, the connection between the antenna 4 in the fixing member 2 and the RF unit in the main body 1 of the wearable electronic device may be implemented better, and the performance of the antenna in the wearable electronic device may be improved.

Alternatively, in another embodiment of the present disclosure, the connecting member 3 further comprises a shaft 302 inserted into the first connecting parts 301, which is used for connecting the fixing member 2 and the main body 1.

In the embodiment of the present disclosure, there may be various manners for connecting the fixing member 2 and the main body 1 by the shaft 302. The present disclosure has no limitation in this regard. Hereafter, two of the manners will be will illustrated in detail.

First Manner

Figure 3A:
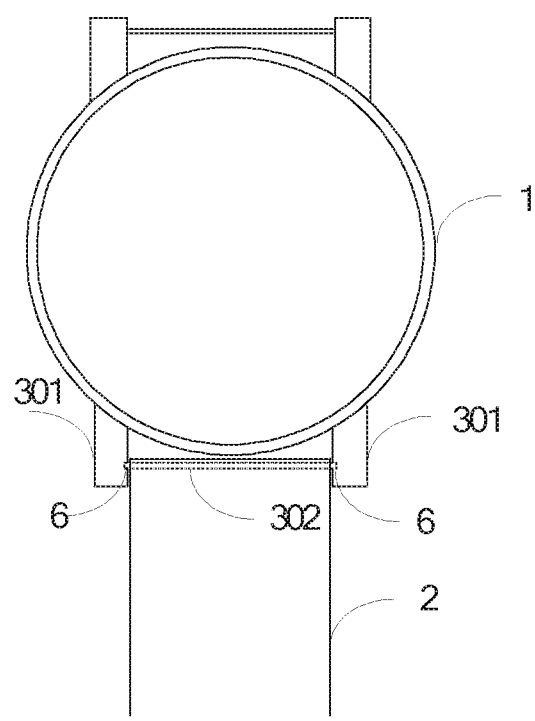
FIGS. 3A-3B illustrate a third structure diagram of a wearable electronic device according to an embodiment of the present disclosure.

Alternatively, see FIG. 3a, in another embodiment of the present disclosure, the connecting member 3 may further include a shaft 302. In this embodiment, the number of the shafts 302 may be equal to the number of the fixing members 2. That is, one shaft 302 corresponds to one fixing member 2. Such a shaft 302 may be inserted between two adjacent first connecting parts 301 of the connecting member 3. The shaft 302 is used for connecting the main body 1 and the fixing member 2.

In this embodiment, the first connecting part 301 may have a hollow structure with a through-hole 6. Two ends of the shaft 302 are respectively inserted in the through-holes 6 of the two connecting parts 301. The fixing member 2 is wrapped around the shaft 302. It may be considered that the fixing member 2 may be bent. The fixing member 2 may be wrapped around an outer surface of the shaft 302. The shaft 302 may be horizontally inserted through the fixing member 2, so that the fixing member 2 may rotate around the shaft 302. Therefore, the fixing member 2 can be movably connected to the main body 1 via the shaft 302. In the connecting manner as shown in FIG. 3a, the watchstrap (the fixing member 2) is wrapped around a shaft 302 which is inserted between the two first connecting parts 301. Like traditional shaft-type watches, the watchstrap can rotate relative to the dial.

Second Manner

Figure 3B:
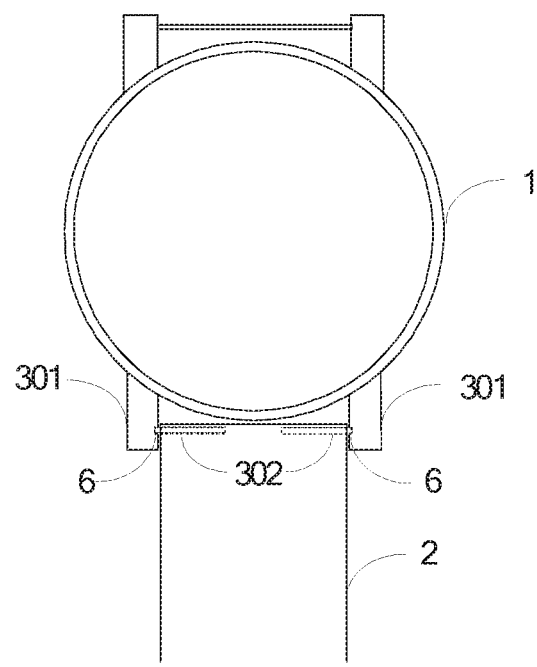

Alternatively, with reference to FIG. 3b, in another embodiment of the present disclosure, the connecting member 3 may further include shafts 302. In this embodiment, one fixing member 2 may correspond to two shafts 302. A shorter shaft 302 is inserted into each of the first connecting parts 301. One fixing member 2 may be connected to the main body 1 by the two shafts 302 inserted between the two adjacent first connecting parts 301.

In this embodiment, the first connecting part 301 may have a hollow structure with a through-hole 6. One end of the shaft 302 is inserted in the through-hole 6 of one of the first connecting parts 301. The fixing member 2 may be concurrently wrapped around outer surfaces of the two shafts 302 which are respectively inserted through the through-holes 6 in the two first connecting parts 301, so that the fixing member 2 may rotate around the two shafts 302 collectively. Therefore, the fixing member 2 can be movably connected to the main body 1 via the two shafts 302. In the connecting manner as shown in FIG. 3b, the first connecting parts 301 on the left and on the right each have one shorter shaft 302 inserted therein, and the watchstrap (the fixing member 2) may concurrently be wrapped around the outer surfaces of the two shafts 302. It can be seen that, such a connecting manner enables the watchstrap of the smart watch to rotate relative to the dial, like the traditional shaft-type watch.

By using the connecting manners provided in various embodiments of the present disclosure, appearance of the smart watch can be consistent with that of the traditional shaft-type watch, conforming to the user's habits and aesthetic.

Alternatively, in another embodiment of the present disclosure, the shaft 302 may have an accommodation space. The first antenna 4 may be connected to the RF unit via the accommodation space of the shaft 302.

In the embodiment of the present disclosure, the first antenna 4 may also be any one of the at least one antenna 4. For example, the at least one antenna 4 of the wearable smart watch comprises a main antenna, a diversity antenna, a GPS-enabled antenna. Then, the first antenna 4 may be e.g. a main antenna, or the first antenna 4 may be a diversity antenna, or the first antenna 4 may be an antenna integrating multiple kinds of antennas, such as an antenna integrating a main antenna, a diversity antenna and a GPS-enabled antenna. The present disclosure has no limitation in this regard.

In the embodiment of the present disclosure, the shaft 302 has a hollow structure with an accommodation space. The first antenna 4 can be connected to the RF unit in the main body 1 via the accommodation space of the shaft 302. The manner of connecting the first antenna 4 and the RF unit in the main body 1 via the accommodation space is not limited in the present disclosure. Based on the two arrangement manners of the shaft(s) 302 as illustrated in the previous embodiment, there may be two corresponding manners of connecting the first antenna 4 to the RF unit in the main body 1 via the shaft(s) 302.

Figure 4A:
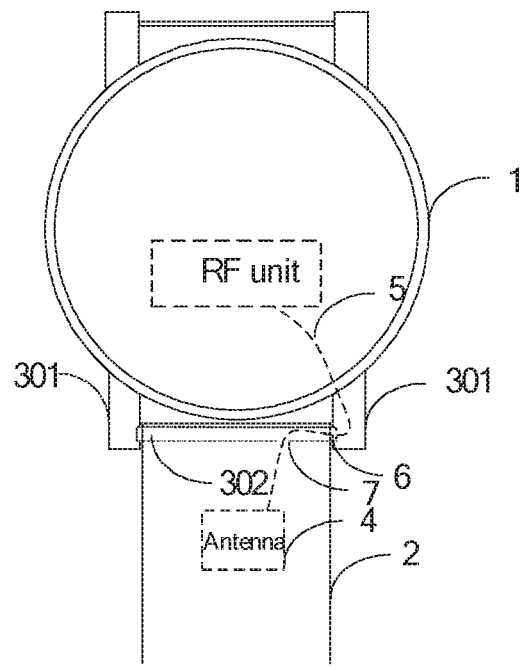
FIGS. 4A-4B illustrate a fourth structure diagram of a wearable electronic device according to an embodiment of the present disclosure.

For example, with reference to FIG. 4a which is corresponding to the arrangement manner of the shaft 302 in FIG. 3a, the conduction means 5 may be used for connecting the first antenna 4 arranged in the fixing member 2 to the RF unit in the main body 1. The antenna 4 in FIG. 4 is the first antenna 4. The shaft 302 has a hollow structure with an accommodation space. The surface of the shaft 302 may have an open pore 7 for arranging a conductor (i.e. the conduction means 5 in the figure). The first antenna 4 arranged in the fixing member 2 may be connected to the RF unit in the main body 1 through the open pore 7 on the surface of the shaft 302 and the accommodation space of the shaft 302. For example, one end of the conduction means 5 may be connected to the first antenna 4. The other end of the conduction means 5 may be connected to the RF unit in the main body 1 by passing through the accommodation space of the shaft 302 via the open pore 7 of the shaft 302 as well as passing through the hollow portion of the first connecting part 301 via the through-hole 6 of the first connecting part 301.

Of course, although it is illustrated in FIG. 4a that the first antenna 4 is connected to the RF unit in the main body 1 via the first connecting part 301 on the right, the first antenna 4 may also be connected to the RF unit in the main body 1 via the first connecting part 301 on the left. In such an implementation, another open pore 7 may be arranged at the left portion of the surface of the shaft 302. The conduction means 5 can connect the first antenna 4 and the RF unit through the open pore 7 on the left (or the open pore 7 on the right) and the first connecting part 301 on the left.

In the embodiment of the present disclosure, both of the first connecting member 301 on the left and the first connecting member 301 on the right may be provided with the conduction means 5 for connecting the first antenna 4 and the RF unit. Then, there may be two first antennas 4 connected to the RF unit in the main body 1 through the first connecting parts 301 on the left and on the right, respectively. For example, the fixing member 2 is provided with two first antennas 4, e.g. a main antenna and a diversity antenna, respectively. The main antenna provided in the fixing member 2 is connected to the RF unit in the main body 1 through the shaft 302 and the first connecting part 301 on the left. The diversity antenna provided in the fixing member 2 is connected to the RF unit in the main body 1 through the shaft 302 and the first connecting part 301 on the right. Alternatively, only one of the connecting parts 301 on the left and on the right is provided with the conduction means 5 for connecting the first antenna 4 and the RF unit. For example, the first antenna 4 is an antenna with the main antenna and the diversity antenna integrated; and the first antenna 4 is connected to the RF unit in the main body 1 through the shaft 302 and the first connecting part 301 on the right. The present disclosure has no limitation in this regard.

Figure 4B:
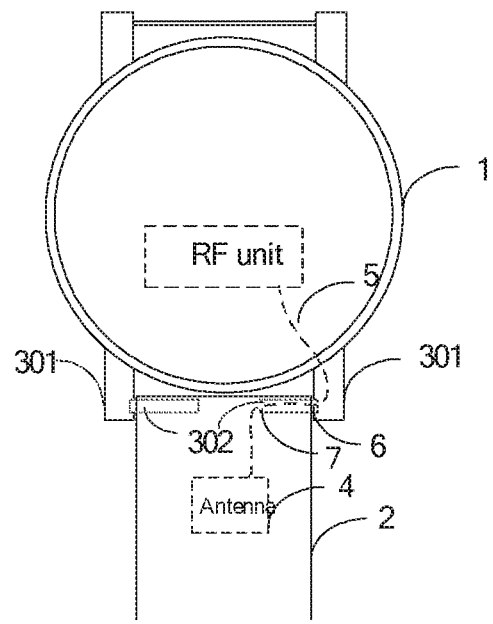

Alternatively, for example, with reference to FIG. 4b which is corresponding to the arrangement manner of the shaft 302 in FIG. 3b, one fixing member 2 is wrapped around the outer surfaces of the two shafts 302 which are respectively inserted in the two first connecting parts 301 on the left and on the right in this embodiment. This embodiment will illustrate the connecting manner by taking the shaft 302 on the right as an example. Likewise, the shaft 302 has a hollow structure with an accommodation space. The surface of the shaft 302 may also have a open pore 7 for arranging a conductor (i.e. the conduction means 5 in the figure). The open pore 7 may be arranged on the left end of the shaft 302 on the right as shown in FIG. 4b, or be arranged on other positions, which are not limited in the present disclosure. The antenna 4 arranged in the fixing member 2 (i.e. the first antenna 4) may be connected to the RF unit in the main body 1 through the open pore 7 on the surface of the shaft 302 on the right and the accommodation space of the shaft 302. For example, one end of the conduction means 5 may be connected to the first antenna 4. The other end of the conduction means 5 may be connected to the RF unit in the main body 1 by passing through the accommodation space of the shaft 302 on the right via the open pore 7 of the shaft 302 on the right as well as passing through the hollow portion of the first connecting part 301 via the through-hole 6 of the first connecting part 301 on the right.

Of course, the antenna 4 in this embodiment may also be connected to the RF unit in the main body 1 via the shaft 302 on the left and the first connecting part 301 on the left in a same or similar manner. Likewise, both of the shafts 302 on the left and on the right may be provided with the conduction means 5 for connecting the first antenna 4 to the RF unit. For example, the fixing member 2 is provided with two first antennas 4, e.g. a GPS-enabled antenna and a Bluetooth-enabled antenna, respectively. The GPS-enabled antenna provided in the fixing member 2 is connected to the RF unit in the main body 1 through the shaft 302 on the left and the first connecting part 301 on the left. The Bluetooth-enabled antenna provided in the fixing member 2 is connected to the RF unit in the main body 1 through the shaft 302 on the right and the first connecting part 301 on the right. Alternatively, only one of the shafts 302 on the left and on the right is provided with the conduction means 5 for connecting the first antenna 4 and the RF unit. For example, the first antenna 4 is an antenna with the GPS-enabled antenna and the Bluetooth-enabled antenna integrated; and the first antenna 4 is connected to the RF unit in the main body 1 through the shaft 302 on the right and the first connecting part 301 on the right. The present disclosure has no limitation in this regard.

By using the above mentioned manners, the appearance of the smart watch can be more consistent with that of the traditional shaft-type watch, conforming to the user's habits and aesthetic, while the transmitting/receiving performance of the antenna in the smart watch may be guaranteed.

Alternatively, in another embodiment of the present disclosure, the first antenna 4 is connected to the RF unit via a conductive part on one end of the shaft 302. The first antenna 4 is any one of the at least one antenna 4.

In the embodiment of the present disclosure, the first antenna 4 may also be any one of the at least one antenna 4. For example, the at least one antenna 4 of the wearable smart watch comprises a main antenna, a diversity antenna, a GPS-enabled antenna. Then, the first antenna 4 may be e.g. a main antenna, or the first antenna 4 may be a diversity antenna, or the first antenna 4 may be an antenna integrating multiple kinds of antennas, such as an antenna integrating a main antenna, a diversity antenna and a GPS-enabled antenna. The present disclosure has no limitation in this regard.

Figure 5A:
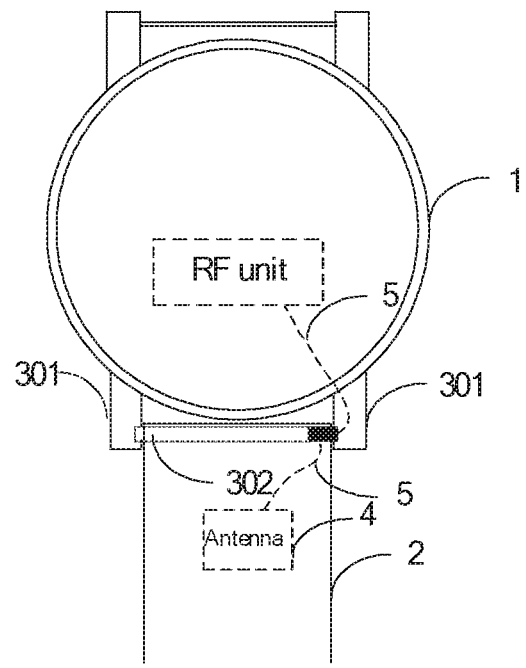
FIGS. 5A-5B illustrate a fifth structure diagram of a wearable electronic device according to an embodiment of the present disclosure.

For example, with reference to FIG. 5a which is corresponding to the arrangement manner of the shaft 302 in FIG. 3a, one end of the shaft 302 may be made of conductive material. The black part on the right end of the shaft 302 as shown in FIG. 5a is the conductive part on one end of the shaft 302 in this embodiment. For example, the right end of the shaft 302 may be made of metal material. Then, the antenna 4 (i.e. the first antenna 4) may be connected to the RF unit in the main body 1 through the conductive part on the right end of the shaft 302. There is no limitation on particular connecting manners in the present disclosure. For example, the first antenna 4 may be connected to the RF unit in the main body 1 by connecting the first antenna 4 to the conductive part on the right end of the shaft 302 via the conduction means 5, and then connecting the conductive part on the right end of the shaft 302 to the RF unit in the main body 1 via the conduction means 5 which passes through the right connecting part 301.

Of course, although it is illustrated in FIG. 5a that the conductive part is located on the right end of the shaft 302, the conductive part may also be located on the left end of the shaft 302. Then, the first antenna 4 arranged in the fixing member 2 may be connected to the RF unit in the main body 1 through the conductive part on the left end of the shaft 302.

In the embodiment of the present disclosure, both of the left and right ends of the shaft 302 may be provided with the conductive parts. Then, there may be two first antennas 4 connected to the RF unit in the main body 1 through the conductive parts on both sides of the shaft 302. For example, the fixing member 2 is provided with two first antennas 4, e.g. a main antenna and a diversity antenna, respectively. The main antenna is connected to the RF unit through the conduction means on the left end of the shaft 302. The diversity antenna is connected to the RF unit through the conduction means on the right end of the shaft 302. Alternatively, only one end of the shaft 302 is provided with the conductive part. Then, one of the first antennas 4 in the fixing member 2 may be connected to the RF unit in the main body 1. For example, the first antenna 4 is an antenna with the main antenna and the diversity antenna integrated. The first antenna 4 is connected to the RF unit through the conduction means on the right end of the shaft 302. The present disclosure has no limitation in this regard.

Figure 5B:
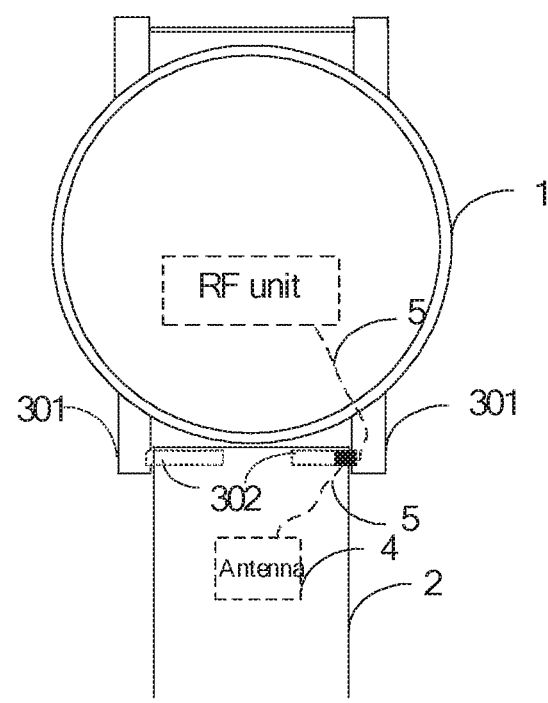

Alternatively, for example, with reference to FIG. 5b which is corresponding to the arrangement manner of the shaft 302 in FIG. 3b, a conductive part, such as a black part on the right end of the right shaft 302 as shown in FIG. 5b, is arranged on one end of a shorter shaft 302 inserted in the first connecting part 301 on the right. The black part may be made of metal material. Then, the antenna 4 (i.e. the first antenna 4) may be connected to the RF unit in the main body 1 through the conductive part on the right end of the right shaft 302. There is no limitation particular connecting manners in the present disclosure. For example, the first antenna 4 may be connected to the RF unit in the main body 1 by connecting the first antenna 4 to the conductive part on the right end of the right shaft 302 via the conduction means 5, and then connecting the conductive part on the right end of the shaft 302 to the RF unit in the main body 1 via the conduction means 5 which passes through the right connecting part 301 on the right.

Of course, although it is illustrated in FIG. 5b that the conductive part is located on the right end of the right shaft 302, the left shaft 302 may also have the conductive part. For example, the conductive part may be located on the left end of the left shaft 302. Then, the first antenna 4 arranged in the fixing member 2 may be connected to the RF unit in the main body 1 through the conductive part on the left end of the left shaft 302.

In the embodiment of the present disclosure, both of the left shaft 302 and the right shaft 302 may be provided with conductive parts. Then, there may be two first antennas 4 connected to the RF unit in the main body 1 through the left and right shafts 302 respectively. For example, the fixing member 2 is provided with two first antennas 4, e.g. the main antenna and the diversity antenna, respectively. The main antenna is connected to the RF unit through the conductive part on the left end of the left shaft 302. The diversity antenna is connected to the RF unit through the conductive part on the right end of the right shaft 302. Alternatively, only one of the shafts 302 on both sides is provided with the conductive part. Then, one of the first antennas 4 in the fixing member 2 may be connected to the RF unit in the main body 1. For example, the first antenna 4 is an antenna with the main antenna and the diversity antenna integrated. The first antenna 4 is connected to the RF unit through the conduction means on the right end of the right shaft 302. The present disclosure has no limitation in this regard.

In such a connecting manner, the appearance of the smart watch can be consistent with that of the traditional shaft-type watch, conforming to the user's habits.

Alternatively, in another embodiment of the present disclosure, one end of the first antenna 4 is connected to the RF unit in the main body 1 through the first connecting part 301, and the other end of the first antenna 4 is configured to:

be connected to a ground point of the wearable electronic device; or, be set in a pendent state; or be connected to the RF unit through a second connecting part of the connecting member, forming a closed loop.

In the embodiment of the present disclosure, firstly, one end of the first antenna 4 arranged in the fixing member 2 is connected to the RF unit in the main body e.g. through a conductor. The other end of the antenna 4 may have a plurality of configurations. For example, the other end of the antenna 4 may be connected to the ground point of the wearable electronic device. There is no limitation on the position of the ground point in the present disclosure. For example, the ground point may be arranged in the fixing member 2. In this case, the other end of the antenna 4 may be directly connected to the ground point in the fixing member 2. Or, the ground point may be arranged in the main body 1. In this case, the other end of the antenna 4 may be connected to the ground point via the conductor.

Alternatively, for example, the other end of the first antenna 4 may be configured in the pendent state. That is, the other end of the first antenna 4 may be arranged in the fixing member 2 but connected to nothing.

Alternatively, for example, the other end of the first antenna 4 may also be connected to the RF unit through the second connecting part of the connecting member 3. The second connecting part may be another connecting part adjacent to the first connecting part 301. That is, both ends of the first antenna 4 may be connected to the RF unit in the main body 1 respectively through the two connecting parts of the connecting member 3, so that the antenna 4 and the RF unit form a closed loop.

In this way, the antenna may be better arranged, and may have stronger signal transmitting/receiving capability.

Alternatively, in another embodiment of the present disclosure, the connecting member 3 further includes an engaging member 303, and the fixing member 2 is connected to the main body via the engaging member.

In this embodiment, the connecting member 3 may comprise one engaging member 303. The fixing member 2 and the main body 1 are snap-fit connected by the engaging member 303.

Figure 6:
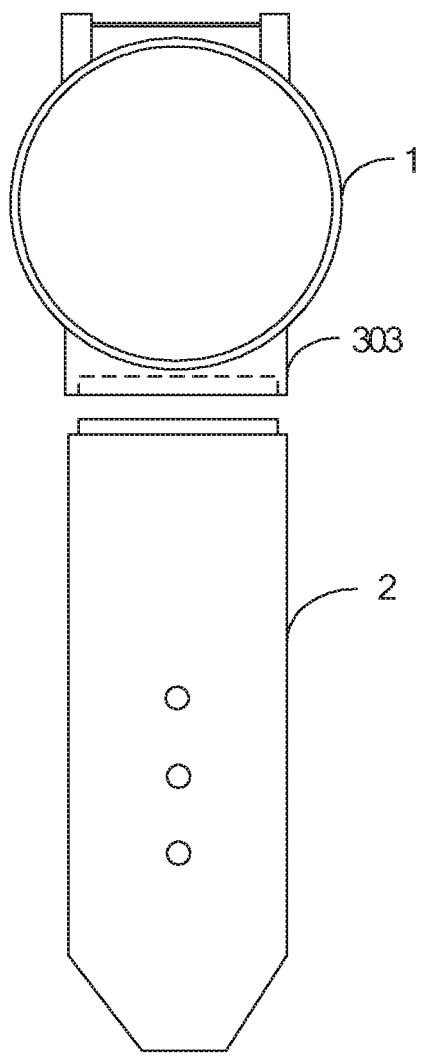
FIG. 6 illustrates a sixth structure diagram of a wearable electronic device according to an embodiment of the present disclosure.

For example, with reference to FIG. 6, the connecting member 3 may include the engaging member 303. The engaging member 303 may be of a recessed structure as shown in FIG. 6. An end of the fixing member 2 has a part which is capable to be snap-fit connected with the engaging member 303, such as a protruding structure matched with the recessed structure of the engaging member 303. By the snap-fit connection between the end of the fixing member 2 and the engaging member 303, the fixing member 2 may be connected to the main body 1. Of course, it is also possible to use other snap-fit connections to snap-fit connect the fixing member 2 and the main body 1, which is not limited in the present disclosure In this way, the diversity of the appearance of the wearable electronic device may be improved.

Alternatively, in another embodiment of the present disclosure, the material for the fixing member 2 may comprise plastic, silicone, rubber, or leather. In the embodiments, the wearable electronic device may comprise more than one fixing member 2. For example, two straps of the smart watch are two fixing members 2. Therefore, for the wearable electronic device comprising a plurality of fixing members 2, each of the fixing members 2 may be made of the same material, or some of the fixing members 2 may be made of material different from some other fixing members 2.

For example, for the smart watch as shown in any of FIGS. 1-6, the materials of the two fixing members 2 may be same or different. For example, one of the two fixing members 2 may be made of plastics, while the other one of the fixing members 2 is made of silica. For another example, one of the two fixing members 2 may be made of rubber, while the other one of the fixing members 2 may be made of leather. Alternatively, both of the fixing members 2 may be made of leather, etc. The embodiment of the present disclosure has no limitation in this regard.

Alternatively, in another embodiment of the present disclosure, if the fixing member 2 is made of plastic, silicone or rubber, the antenna 4 may be fixed in the fixing member 2 by injection molding.

If the fixing member 2 is made of leather, generally, the inner of the fixing member 2 may be hollow when the leather is used as the material for the fixing member 2. That is, it is possible to form a fixing member 2 with a hollow structure by two layers of leather. Then, the antenna 4 may be secured in the hollow portion of the fixing member 2 by an adhesive.

It can be seen that, the fixing member 2 may be made of various materials in the embodiment of the present disclosure. The choice of the materials has a broader range. The antenna 4 of the wearable electronic device 4 may be arranged in different manners as different materials are chosen.

Alternatively, in another embodiment of the present disclosure, the wearable electronic device comprises a watch, a bracelet or glasses, such as a smart watch, a smart bracelet or smart glasses, etc.

It is obvious that various modifications and alternatives can be made by those skilled in the art without departing from the scope of the present disclosure. These modifications and alternatives are to be encompassed by the scope of the present disclosure if they are within the scope of the claims and their equivalents.

What is claimed:

1. A wearable electronic device, comprising:
   a main body;
   a fixing member movably connected to the main body and configured to fix the main body on a supporting member;
   a connecting member, comprising a first connecting part and a shaft adapted to the first connecting part, wherein a first antenna of at least one antenna is connected to the radio frequency unit via a conductive part on one end of the shaft and via the first connecting part at the same end; and the shaft is configured to connect the main body and the fixing member; and
   the at least one antenna arranged in the fixing member, connected to a radio frequency unit in the main body via the connecting member, and configured to transmit signals.

2. The wearable electronic device according to claim 1, wherein the first antenna being any one of the at least one antenna.

3. The wearable electronic device according to claim 1, wherein one end of the first antenna is connected to the radio frequency unit in the main body via the first connecting part, and the other end of the first antenna is configured to:
   be connected to a ground point of the wearable electronic device;
   or be set in a pendent state;
   or be connected to the radio frequency unit via a second connecting part of the connecting member, and form a closed loop.

4. The wearable electronic device according to claim 1, wherein
   the connecting member further comprises an engaging member, and the fixing member is connected to the main body via the engaging member.

5. The wearable electronic device according to claim 1, wherein
   the fixing member is made of plastic, silicone, or rubber, the at least one antenna being fixed in the fixing member by injection molding.

6. The wearable electronic device according to claim 1, wherein
   the fixing member is made of leather, and the fixing member has a hollow portion, the antenna being secured in the hollow portion of the fixing member by an adhesive.

7. The wearable electronic device according to claim 1, wherein
   the antenna comprises at least one of a main antenna, a diversity antenna, a Global Positioning System-enabled antenna, a Wireless Local Area Network-enabled antenna and a Bluetooth-enabled antenna.

* * * * *